Patented July 17, 1928.

1,677,753

UNITED STATES PATENT OFFICE.

OTTO DROSSBACH, OF LUDWIGSHAFEN-ON-THE-RHINE, AND OTTO JORDAN, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

CELLULOSE COMPOSITION.

No Drawing. Application filed July 2, 1926, Serial No. 120,254, and in Germany July 24, 1925.

We have found that the esters of ethylene di-carboxylic acid, whether employed in the trans-form (fumaric acid) or in the cis-form (maleic acid), with aliphatic or hydroaromatic alcohols are excellent solvents and plasticizers for cellulose derivatives that is to say cellulose esters such as cellulose nitrate or acetate, and cellulose ethers. They are very efficient for dissolving and gelatinizing such cellulose derivatives and have the great advantage of evaporating slowly and imparting to the cellulose derivatives a high suppleness, which properties are very desirable for many purposes.

For example, maleic acid dimethyl ester readily dissolves cellulose nitric or acetic acid esters; the solutions so obtained can be diluted to a great extent with other solvents or plasticizers, or with non-dissolving diluents such as alcohols, ethers, hydrocarbons and their halogen derivatives, or with mixtures of such solvents and diluents; after evaporation the cellulose ester is left behind as a clear, supple film.

The following examples will serve to further illustrate how our invention may be carried out in practice, but the invention is not limited to these examples. The parts are by weight.

Example 1.

Cellulose nitrate is made into a homogeneous mass in a kneading machine by means of alcohol and about 40 per cent its weight of furmaric acid di-isobutyl ester at from 60° to 70° C., in the manner usual in the celluloid industry. The mixture can be well rolled at 80° C. and after being pressed at 80° to 90° C., can be cut to beautiful, clear celluloid sheets. After drying, the finished celluloid is not different from that prepared with the aid of camphor; it can be torn at room temperature without exhibiting brittleness.

In a similar manner the esters of fumaric or maleic acid with other aliphatic or with hydroaromatic alcohols, for example the di-methyl, di-ethyl, di-propyl, di-amyl, di-hexyl or di-cyclohexyl esters can be employed for dissolving cellulose nitrate; generally a quantity of ester corresponding to between 35 and 50 per cent of the weight of the cellulose nitrate will be employed.

Example 2.

50 parts of collodion are dissolved in a mixture of 450 parts of ethylene glycol mono-ethyl ether, 475 parts of benzene and 25 parts of maleic acid di-ethyl ester. The lacquer so obtained forms bright, supple film coatings. Instead of maleic acid di-ethyl ester, other aliphatic or hydroaromatic esters of maleic or fumaric acid may be employed.

Example 3.

Ethyl cellulose is kneaded with alcohol and about 75 per cent its weight of maleic acid di-methyl ester at an elevated temperature and converted into a plastic mass. Instead of the said ester, other esters of fumaric or maleic acid may be employed in about the same quantity.

We claim:

1. A mixed solvent for cellulose derivatives comprising an ester of an ethylene di-carboxylic acid with a non-aromatic alcohol.

2. A composition of matter comprising a cellulose derivative and an ester of an ethylene di-carboxylic acid with a non-aromatic alcohol.

3. A composition of matter comprising cellulose nitrate and an ester of an ethylene di-carboxylic acid with a non-aromatic alcohol.

4. The process of preparing plastics which consists in treating a cellulose derivative with an ester of an ethylene di-carboxylic acid with a non-aromatic alcohol.

In testimony whereof we have hereunto set our hands.

OTTO DROSSBACH.
OTTO JORDAN.